(12) United States Patent
Sprague et al.

(10) Patent No.: US 12,092,479 B2
(45) Date of Patent: Sep. 17, 2024

(54) MAP FEATURE IDENTIFICATION USING MOTION DATA AND SURFEL DATA

(71) Applicant: Google LLC, Mountain View, CA (US)

(72) Inventors: Michael Sprague, Longmont, CO (US); Kevin Oishi, Boulder, CO (US); Luigi Bruno, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/945,602

(22) Filed: Sep. 15, 2022

(65) Prior Publication Data

US 2023/0016153 A1    Jan. 19, 2023

Related U.S. Application Data

(63) Continuation of application No. 16/415,357, filed on May 17, 2019, now Pat. No. 11,454,502.

(51) Int. Cl.
*G01C 21/00* (2006.01)
*G01C 21/20* (2006.01)
*G01S 17/89* (2020.01)

(52) U.S. Cl.
CPC ....... *G01C 21/3867* (2020.08); *G01C 21/206* (2013.01); *G01S 17/89* (2013.01)

(58) Field of Classification Search
CPC .... G01C 21/3867; G01C 21/206; G01S 17/89
See application file for complete search history.

(56) References Cited

U.S. PATENT DOCUMENTS

| | | | |
|---|---|---|---|
| 8,209,143 B1 | 6/2012 | Anguelov et al. | |
| 9,244,152 B1* | 1/2016 | Thiagarajan | G01S 5/0264 |
| 9,275,302 B1* | 3/2016 | Yan | G06F 18/256 |
| 9,716,974 B2 | 7/2017 | Yamasaki et al. | |

(Continued)

FOREIGN PATENT DOCUMENTS

| | | |
|---|---|---|
| JP | 2006/030717 | 2/2006 |
| WO | WO 2014/177604 | 11/2014 |

OTHER PUBLICATIONS

English Translation of JP 2006030717 A Author: Kamishina et al. Title: Polygon Data Edition Method on GIS Date: Feb. 2, 2006 (Year: 2006).*

(Continued)

*Primary Examiner* — James J Lee
*Assistant Examiner* — Steven Vu Nguyen
(74) *Attorney, Agent, or Firm* — DORITY & MANNING P.A.

(57) ABSTRACT

Systems and methods for generating geographic data for map elements based on surfel data and motion data associated with a geographic region are disclosed. A computing system can obtain motion data indicative of movement of at least one object in a geographic region represented by a map. The computing system can additionally obtain surfel data indicative of one or more surface elements associated with a surface of a structure in the geographic region represented by the map. The computing system can identify an entrance of the structure based at least in part on a correlation of the surfel data and the motion data. The computing system can generate geographic data indicative of a geographic location of the entrance of the structure.

6 Claims, 10 Drawing Sheets

(56) References Cited

U.S. PATENT DOCUMENTS

| | | | |
|---|---|---|---|
| 9,726,504 | B2 | 8/2017 | Rachuri et al. |
| 9,797,740 | B2 | 10/2017 | Verheyen et al. |
| 11,043,026 | B1* | 6/2021 | Fathi .................. G06N 20/00 |
| 2014/0248900 | A1* | 9/2014 | Modica ............ H04W 64/006 |
| | | | 455/456.1 |
| 2014/0267631 | A1 | 9/2014 | Powers et al. |
| 2016/0109245 | A1* | 4/2016 | Denaro ................ G01C 21/36 |
| | | | 701/450 |
| 2016/0288330 | A1 | 10/2016 | Konolige |
| 2017/0091553 | A1* | 3/2017 | Liu .......................... G06T 7/90 |
| 2018/0060664 | A1 | 3/2018 | Liu |
| 2018/0082435 | A1* | 3/2018 | Whelan .................. G06T 7/579 |
| 2018/0087922 | A1* | 3/2018 | Wu ........................ G01C 21/32 |

OTHER PUBLICATIONS

International Preliminary Report on Patentability for Application No. PCT/US2018/050600, mailed Mar. 25, 2021, 7 pages.

Lyardet et al. "CoINS: Context Sensitive Indoor Navigation System", Eighth Institute of Electrical and Electronics Engineers International Symposium on Multimedia, Dec. 13, 2006, San Diego, California, 8 pages.

Park et al., "Probabilistic Surfel Fusion for Dense Lidar Mapping", International Conference on Computer Vision, Oct. 22-29, 2017, Venice, Italy.

Saurabh et al. "Algorithms for Automated Generation of Navigation Models from Building Information Models to Support Indoor Map-Matching", Automation in Construction, vol. 61, 2016, p. 24-41.

Search Report and Written Opinion for PCT/US2018/050600, mailed on Feb. 5, 2019, 11 pages.

Talebi et al., "Vision-Based Entrance Detection in Outdoor Scenes", Multimedia Tools and Applications, 2018, 20 pages.

Wendel et al., "Unsupervised Façade Segmentation Using Repetitive Patterns", Annual Symposium of the German Association for Pattern Recognition, Sep. 22-24, 2010, Darmstadt, Germany, 10 pages.

Machine Translated Chinese Search Report Corresponding to Application No. 2018800934347 on Nov. 2, 2023.

* cited by examiner

US 12,092,479 B2

MAP FEATURE IDENTIFICATION USING MOTION DATA AND SURFEL DATA

PRIORITY CLAIM

The present application is a continuation of U.S. application Ser. No. 16/415,357 having a filing date of May 17, 2019, which is based upon and claims the right of priority under 35 U.S.C. § 371 to International Application No. PCT/US2018/050600 filed on Sep. 12, 2018. Applicant claims priority to and the benefit of each of such applications and incorporate all such applications herein by reference in its entirety.

FIELD

The present disclosure relates generally to mapping applications that provide and/or display map data associated with a geographic area.

BACKGROUND

A geographic information system (GIS) is a system for archiving, retrieving, and manipulating data that has been stored and indexed according to the geographic coordinates of its elements. The system generally can utilize a variety of data types, such as imagery, maps, and tables. GIS technology can be integrated into Internet-based mapping applications.

Such mapping applications can be, or can otherwise be associated with, software applications that display interactive digital maps. For example, mapping applications may run on laptop and tablet computers, mobile phones, car navigation systems, hand-held global positioning system (GPS) units, etc. Many of these devices are equipped with a touchscreen, a touchpad, or are otherwise configured to receive input that includes finger gestures. A user may, for example, pan across a map by swiping her finger in the desired direction, zoom in on an area by pinching two fingers together, etc.

In general, a mapping application can display various types of geographic data including topographical data, street data, urban transit information, and traffic data. Further, the geographic data may be schematic or based on photography, such as satellite imagery. Still further, a mapping application can display the information in a two-dimensional (2D) or three-dimensional (3D) format.

SUMMARY

Aspects and advantages of embodiments of the present disclosure will be set forth in part in the following description, or may be learned from the description, or may be learned through practice of the embodiments.

One example aspect of the present disclosure is directed to a computing system for providing map information. The computing system comprises one or more processors and one or more non-transitory, computer-readable media that store instructions that when executed by the one or more processors cause the computing system to perform operations. The operations comprise obtaining motion data indicative of movement of at least one object in a geographic region represented by a map, obtaining surfel data indicative of one or more surface elements associated with a surface of a structure in the geographic region represented by the map, identifying an entrance of the structure based at least in part on a correlation of the surfel data and the motion data, and generating geographic data indicative of a geographic location of the entrance of the structure.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for providing map data for display in user interfaces.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
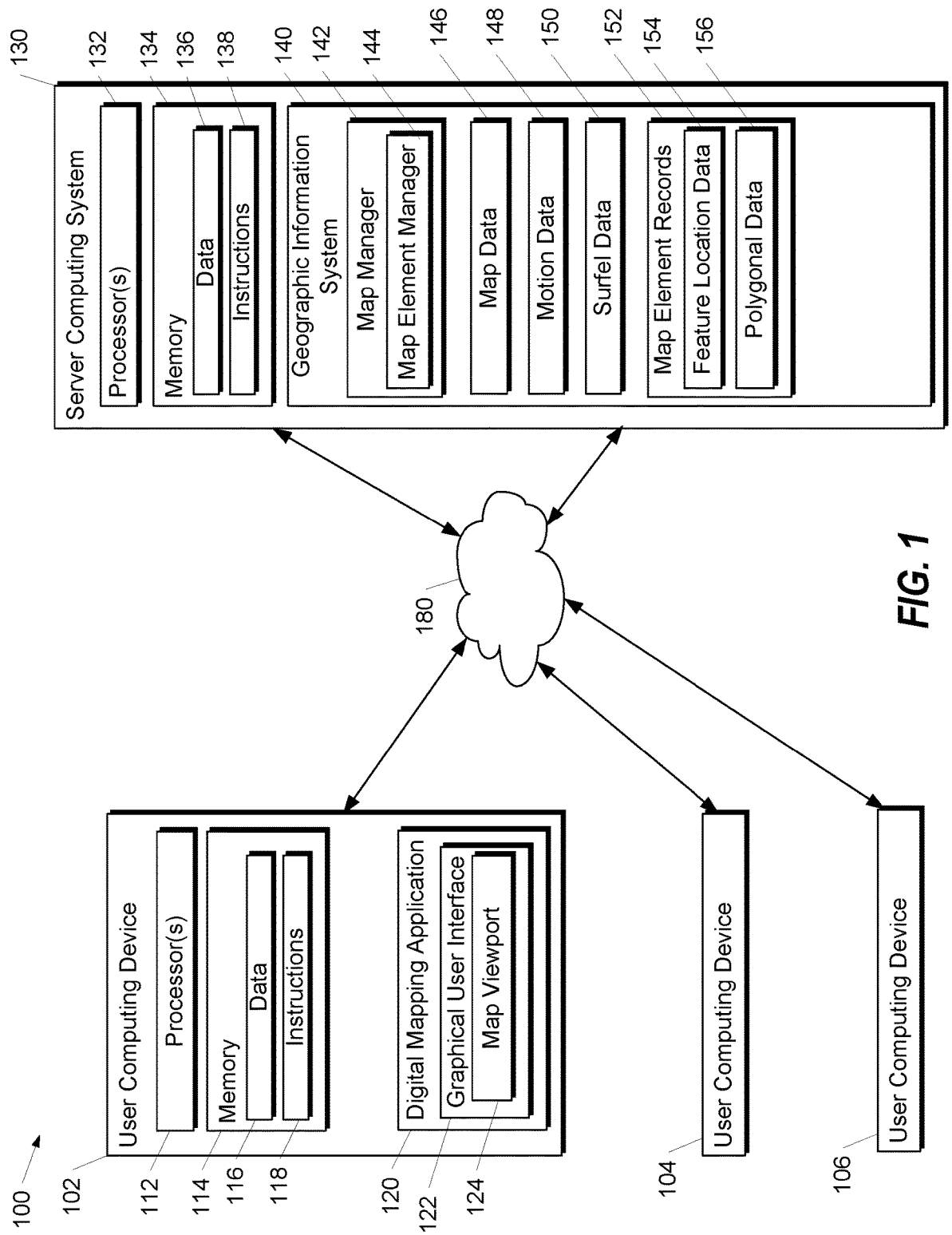
FIG. 1 depicts a block diagram of an example system for determining and providing geographic data from a geographic information system in accordance with example embodiments.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods for determining geographic information for features of map elements associated with a geographic information service. For example, the disclosed technology may be used to determine the location of an entrance of a building or other structure depicted in association with a map of a geographic region. More particularly, the disclosed technology relates to the utilization of surfel data in combination with motion data, and optionally other geographic information, to determine the location of features of map elements. For example, surfel data may be obtained that represents one or more surface elements of a map element, such as the outer surface of a wall of a building or other structure. The surfel data may represent the surface of one or more walls or other elements that are visible from a streetview, for example. Additionally, motion data may be obtained that represents movement of one or objects in the geographic region. The motion data may be indicative of a motion path of at least one object. The motion data can be correlated with the surfel data to identify a feature of the structure. More particularly, the motion data can include one or more traces indicative of a movement of one or more objects. The intersection of one or more traces from the motion data and the wall as identified from the surfel data, for example, can be used to determine a geographic location of a feature of the structure, such as an entrance of a building. The term entrance is used to refer to any location of a structure where ingress or egress of objects may occur. An entrance may refer to a door or opening through which pedestrians or other objects enter and/or exit a building. In some examples, additional data and/or operations may be used to determine the geographic location of a map element feature.

According to some aspects of the present disclosure, geographic data may be obtained including polygonal data that defines at least a portion of an outer dimension (e.g., a perimeter) of a building or other structure represented by a map element. Additionally, motion data can be obtained that is indicative of the movement of one or more objects in the geographic region including the map element. The motion data and polygonal data associated with the map element can be analyzed to determine a candidate location of a feature of the map element. For example, the intersection of the polygonal data representing a building wall and a motion data trace may be identified as a candidate location of a building entrance. A candidate location can be defined using location data such as latitude/longitude coordinates, earth-centered earth-fixed coordinates, World Geodetic System coordinates, or other suitable coordinates. Additionally, data for a candidate location can further define one or more physical attributes of a candidate location of a map element feature, such as the size (e.g., height and/or width of an entrance) or other physical attribute information. Optionally, data indicative of a candidate location may further identify an importance, confidence, and/or direction associated with the candidate location.

According to example embodiments, the candidate location of a feature of a map element can be refined based at least in part on surfel data associated with the map element. Surfel data can be obtained that is indicative of surface elements associated with a structure, such as a wall of a building, for example. The surfel data can represent the building wall as a set of points, also referred to as a surfel. The surfel data may represent a more accurate location of the building wall in comparison to the polygonal data in some instances. The use of high-precision sensing to generate surfels of the building wall, such as through LIDAR or visual imaging, can be used. A surfel, in some examples, comprises a dense set of points that can form a disc. A surfel can include information defining properties of the disc, such as the flatness and/or normal of the disc. In some examples, a surfel can be described in terms of a point and an associated normal vector. In some embodiments, LIDAR data collected from one or more LIDAR sensors can be used to generate surfel data for surfaces of objects in an environment. For instance, a vehicle or person can traverse one or more travelways and collect surfel data associated with the external environment using one or more sensors. Visual imagery, location data, and/or other data may be obtained while the LIDAR data is obtained. The visual imagery and LIDAR data can be closely aligned based on location identifying information associated with each. Moreover, the joint collection of the data from sensors attached to a common platform can provide data alignment. In some embodiments, visual imagery may be used to generate surfel data. For instance, visual imagery from a plurality of client devices can be aggregated to generate surfel data associated with an external environment.

The surfel data can be used to identify a location of a feature of a map element. For example, the candidate location of an entrance associated with a structural wall defined by polygonal data can be projected onto the wall as identified from the surfel data. After projecting the candidate location to a projected location based on the surfel data, a final geographic location of the entrance of the structure can be determined. In some examples, the final geographic location is the same as the projected geographic location. In other examples, the final geographic location can be determined by combining the candidate location and projected location. For example, the candidate location can be modified based on decreasing a distance between a set of points of the candidate location and a set of points of the projected location. An updated alignment can be determined that decreases the cumulative distance between the first set of points and the second set of points. Geographic data indicative of the final geographic location can be generated.

By way of example, polygonal data may include a set of earth-centered, earth-fixed coordinates that define a structure as a bounding box in a geographic region associated with a map. The bounding box may be representative of the perimeter of a building for example. The polygonal data may be generated using various techniques and data sources, such as through an analysis of aerial imagery, satellite imagery, street-level imagery, etc. The analysis may be manual or computer-implemented. In some examples, one or more machine-learned models can be used to automatically generate geographic data associated with a structure based on such imagery, etc. Alternatively or additionally, the polygonal data can be manually added (e.g., through interaction with the geographic information service by an operator of the service or an owner of the structure).

Motion data, for example, can be generated using various techniques and data sources, such as by collecting location data (e.g., GPS data), movement data (e.g., acceleration, velocity), and/or other data based on movement of one or more objects through a geographic region. Motion data may be generated based on sensor data including location and/or movement of a client device over time. The motion data may indicate one or more motion paths, each of which can be determined from the movements of a plurality of objects in a geographic area. Such motion data may be used to build a motion map indicating building layouts, pedestrian passages, trails, etc. Motion data may additionally and/or alternatively be generated from sensor data indicating where a client device enters or exits a building, such as by detecting changes in signal strengths associated with different communication protocols. For instance, a decrease in a Wi-Fi signal and an increase in a GPS signal can be interpreted as an indication of a device leaving a building. The motion data can be collected from a plurality of client devices associated with a plurality of users. The motion data may be indicative of movement of the plurality of users in the geographic region. Individual traces associated with sensor data from a plurality of client devices may be aggregated into one or more aggregated traces in some examples. Motion data may additionally and/or alternatively include occupancy data indicating a number of users present in a particular location or moving in a particular location during a time period. Further, motion data may include pedestrian walking paths that are associated with directions of movement. In this manner, it can be determined whether an entrance is an "enter" or "exit" only, based on the direction(s) of pedestrian movement. For instance, if a threshold percentage of pedestrians (e.g., 80%) are traveling into a building through an entrance, it can be inferred that the entrance is for entering the building.

Embodiments of the disclosure may utilize additional data in determining location data for a feature of a map element. For instance, a door detection machine-learned model may be used to remove false positives from candidate locations detected from motion data and polygonal data. In some examples, human operators may also remove false positives from candidate locations. Additionally, and/or alternatively, a machine-learned model may be used to initially generate polygonal data including coordinates for an entrance. In some examples, an object detection machine-learned model may be used to detect objects which can then be used to modify location data by aligning objects in view. Surfel data may be used to align a map element based on a depth detection, while an object detection model can be used to align a map element in an orthogonal direction, such as in a left/right direction relative to the depth direction.

In accordance with some implementations, geographic data including polygonal data for a structure may be modified or otherwise refined based on surfel data associated with at least one external wall of the structure. For instance, geographic data may be obtained that includes initial polygonal data for a building. Motion data associated with object movement in a geographic region associated with the structure can also be obtained, and a candidate entrance location of the structure determined based on an intersection of a trace from the motion data and the polygonal data of a wall of the structure. Surfel data associated with the wall can then be obtained. The candidate location of the entrance can be projected onto the wall of the structure as derived from or otherwise identified by the surfel data. A final geographic location of the structure entrance can be determined from the projected entrance location as earlier described.

The geographic data defining the original polygonal representation of the structure can be modified based on the surfel data associated with the wall of the structure. For instance, a misalignment or disparity between the polygonal data representing the wall location and the surfel data representing the wall location can be determined. The misalignment can be determined based on a difference between the candidate location and the projected location of the structure entrance in some examples. The misalignment between the polygonal representation and the surfel data representing the wall can be used to modify the original polygonal data of the structure in the geographic data.

According to some examples, geographic data including polygonal data for a structure can be modified by aligning the polygonal data of a selected wall of the structure with the surfel data for the selected wall. For instance, a set of vertices or points of the polygonal representation of the wall may be selected and compared with a set of vertices or points of the surfel data. The vertices or points of the polygonal data can be adjusted to align with the corresponding vertices or points of the surfel data. After aligning the wall corresponding to the surfel data, the remaining portion of the polygonal data can be modified based on the new polygonal data for the shifted wall data.

In some examples, the original polygonal data of a structure can be modified by generating new polygonal data that is based on a combination of the original polygonal data and the surfel data. For instance, a set of vertices or points of the polygonal data can be compared with a corresponding set of vertices or points of the surfel data. A difference between a point of the polygonal data and a corresponding point of the surfel data can be determined. A new set of points for the polygonal data can be determined based on a minimization of the distance between the points in the original polygonal data and the surfel data. A least squares technique may be applied in example embodiments. An updated alignment can be determined that decreases the cumulative distance between the set of points in the polygonal data and the set of points in the surfel data.

According to some aspects of the disclosed technology, a projected location of a structure entrance based on surfel data can be used to infer location data for one or more points for which the system does not have surfel data. For example, a candidate location for a first building entrance on a first wall can be determined based on motion data and polygonal data for the building. Similarly, a candidate location for a second building entrance on a second wall can be determined based on motion data and polygonal data for the building. Surfel data for the first wall corresponding to the candidate location of the building entrance can be obtained. The candidate location for the first building entrance can be projected onto the surfel data for the wall, and a misalignment between the candidate location and the projected location determined. The candidate location of the second building entrance can be projected to a new location based on the misalignment between the candidate location and projected location of the first building entrance. For example, an offset between the candidate location and projected location of the first building entrance can be applied to the candidate location of the second building entrance to determine a projected location of the second building entrance. A final geographic location for the second building entrance can be determined as the projected location, or from a combination of the projected location and the candidate location. In this manner, a final geographic location of the second building entrance can be determined without obtaining surfel data of the second building entrance. It is noted that the location of a second building entrance can be determined when the first and second building entrances are part of the same building, or when the second building entrance is part of a different building that is somehow connected (directly or indirectly through other buildings) to the building of the first entrance. For example, the location of an entrance of a second building in a strip mall may be determined based on the location of an entrance of a first building in the strip mall.

According to some aspects, a validation of the final geographic location of a structural feature determined from the surfel data and motion data can be performed. In some examples, a human operator may indicate on a visual image of the structure wall a location of the structure entrance. The visual image may be tightly correlated with the surfel data, based on a location data and/or shared positioning of sensors, for example. For example, the visual data and surfel data may be collected at the same time, such as by attaching one or more sensors (e.g., LIDAR) for generating surfel data and one or more sensors for generating visual data to the same platform. The sensors may be attached to a platform carried by a vehicle or by a person (e.g., in a backpack). The resulting surfel data and visual data are tightly correlated due to a shared position and/or orientation of the sensors. A comparison of the entrance location identified by the human operator can be compared with the determined final geographic location. In other examples, a machine-learned model may be trained to identify the location of an entrance based on imagery of the structure. The location determined by the machine-learned model can be compared with the final geographic location to validate the determination.

The systems and methods of the present disclosure can provide a number of technical effects and benefits. For example, the systems and methods disclosed herein provide techniques that can be leveraged by computing systems including servers, such as those hosting geographic information systems, to determine and provide map data including geographic data for structures and features of structures in a geographic region. Additionally, the systems and methods disclosed herein provide techniques that can be leveraged by computing systems including communications devices to improve graphical user interfaces that display map information. The systems and methods disclosed herein may provide particular improvements to existing systems that utilize limited data sets, such as polygonal data alone, to determine and represent the location of map elements and features. The disclosed technology enables location data to be determined for map elements based on combinations of motion data and surfel data to provide more accurate geographic information. The disclosed technology permits more accurate map data to be determined for various map elements, for the display of more accurate map information on a communications device, and for the display of map information in a more accessible manner. As an example, the disclosed technology may enable the generation of improved map data that is descriptive of locations of structural features which can enable more efficient locomotion of autonomous entities such as package delivery robots, warehouse service robots, and the like. As another example, more efficient routing of vehicles (e.g., autonomous vehicles) may be provided, such as may be used to drop passengers at entrances of desired structures rather than generic structural locations. Such routing may improve vehicle operations by saving gas, time, etc.

By way of example, embodiments of the disclosure may address an inability of a conventional computing device to provide accurate geographic data for features of map elements, such as the entrances for a building. In particular, the disclosure can make it possible to determine location data for features of map elements, where such location data is not directly obtainable. This may be accomplished by correlating surfel data that represents one or more surface elements of a wall of a structure with motion data indicative of the movement of one or more objects. For example, an intersection of motion data and surfel data for a wall can be used to infer location information for an entrance of the structure. In some examples, additional polygonal data can be used to further improve the determination of location data for features of map elements. For instance, polygonal data and motion data can first be correlated to identify a candidate location of a feature of a wall. The candidate location can then be projected onto surfel data for the wall. The projected location and/or the candidate location can be used to determine final location data for the feature.

By way of example, embodiments of the disclosure may further address an inability of a conventional computing device to improve polygonal data for map elements based on additional data sources. In particular, the disclosure can be used to modify polygonal data that may be determined from aerial imagery and the like, based on a correlation of such polygonal data with surfel data. This may be accomplished by determining a misalignment between a candidate location of a map feature associated with the polygonal data and a projected location of the map feature associated with surfel data. The misalignment can be used to modify the initial polygonal data for the structure. Updated geographic data for the structure can be generated based on the modified polygonal data.

In some implementations, in order to obtain the benefits of the techniques described herein, the user may be required to allow the collection and analysis of location information associated with the user or her device. For example, in some implementations, users may be provided with an opportunity to control whether programs or features collect such information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable information is removed. As an example, a computing system can obtain real-time location data which can indicate a location, without identifying any particular user(s) or particular user computing device(s).

With reference now to the figures, example aspects of the present disclosure will be discussed in greater detail.

FIG. 1 depicts a block diagram of an example computing environment 100 in which embodiments of the present disclosure may be practiced for generating map data including geographic information for map element features, such as geographic information describing an entrance of a building or other physical structure. The environment 100 can be implemented using a client-server architecture that includes a server computing system 130 that communicates with one or more user computing devices 102, 104, 106 (e.g., client devices) over a network 180. The environment 100 can be implemented using other suitable architectures, such as a single computing device or additional computing devices.

The environment 100 includes a server computing system 130, such as a web server and/or application server, etc. The server computing system 130 can host a geographic information system 140, such as a geographic information system associated with a mapping service. The server computing system 130 can be implemented using any suitable computing device(s). The server computing system 130 can have one or more processors 132 and one or more memory devices 134. The server computing system 130 can also include a network interface used to communicate with one or more user computing devices over the network 180. The network interface can include any suitable components for interfacing with one more networks, including for example, transmitters, receivers, ports, controllers, antennas, or other suitable components.

The one or more processors 132 can include any suitable processing device, such as a microprocessor, microcontroller, integrated circuit, logic device, or other suitable processing device. The one or more memory devices 134 can include one or more computer-readable media, including, but not limited to, non-transitory computer-readable media, RAM, ROM, hard drives, flash drives, or other memory devices. The one or more memory devices 134 can store information accessible by the one or more processors 132, including computer-readable instructions 138 that can be executed by the one or more processors 132. The instructions 138 can be any set of instructions that when executed by the one or more processors 132, cause the one or more processors 132 to perform operations. For instance, the instructions 138 can be executed by the one or more processors 132 to implement a map manager 142. Thus, although shown separately from instructions 138, map manager 142 may be included in the memory 134 as instructions 138.

As shown in FIG. 1, the one or more memory devices 134 can also store data 136 that can be retrieved, manipulated, created, or stored by the one or more processors 132. The data 136 can include, for instance, map data 146, motion data 148, surfel data 150, and/or map element records 152. The data 136 can be stored in one or more databases. The one or more databases can be connected to the server computing system 130 by a high bandwidth LAN or WAN, or can also be connected to server computing system 130 through network 180. The one or more databases can be split up so that they are located in multiple locales.

Server computing system 130 can exchange data with one or more client devices such as user computing devices 102, 104, 106. User computing devices 102, 104, 106 are one example of a communication device. Although three client devices are illustrated in FIG. 1, any number of client devices can be connected to the server computing system 130 over the network 180. Each of the client devices can be any suitable type of computing device, such as a general purpose computer, special purpose computer, laptop, desktop, mobile device, navigation system, smartphone, tablet, wearable computing device, a display with one or more processors, or other suitable computing device.

Similar to the server computing system 130, a user computing device 102, 104, 106 can include one or more processor(s) 112 and a memory 114. The one or more processor(s) 112 can include one or more central processing units (CPUs), graphics processing units (GPUs) dedicated to efficiently rendering images or performing other specialized calculations, and/or other processing devices. The memory 114 can include one or more computer-readable media and can store information accessible by the one or more processors 112, including instructions 118 that can be executed by the one or more processors 112 and data 116. For instance, the memory 114 can store instructions 118 for implementing a digital mapping application 120 for displaying map data and other data determined according to example aspects of the present disclosure.

The user computing devices of FIG. 1 can include various input/output devices for providing and receiving information from a user, such as a touch screen, touch pad, data entry keys, speakers, and/or a microphone suitable for voice recognition. For instance, the user computing devices can have a display device for presenting a graphical user interface 122 displaying that data and other data within a map viewport 124 according to example aspects of the present disclosure.

The user computing devices can also include a network interface used to communicate with one or more remote computing devices (e.g. server computing system 130) over the network 180. The network interface can include any suitable components for interfacing with one more networks, including for example, transmitters, receivers, ports, controllers, antennas, or other suitable components.

The network 180 can be any type of communications network, such as a local area network (e.g. intranet), wide area network (e.g. Internet), cellular network, or some combination thereof. The network 180 can also include a direct connection between a user computing device 102, 104, 106 and the server computing system 130. In general, communication between the server computing system 130 and a user computing device 102, 104, 106 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Server computing system 130 can host a geographic information system (GIS) 140. The GIS 140 can implement a mapping application, a virtual globe application, or any other suitable GIS. The GIS 140 can provide for the archiving, retrieving, and manipulation of geospatial data that has been indexed and stored according to geographic coordinates, such as latitude, longitude, and altitude coordinates, associated with the geospatial data. The GIS 140 can combine satellite imagery, photographs, maps, models, and other geographic data, and Internet search capability so as to enable a user to view imagery of the planet (e.g. map data associated with a plurality of geographic areas) and related geographic information (e.g., locales such as islands and cities, and points of interest such as local restaurants, hospitals, parks, hotels, and schools). The GIS 140 further allows a user to conduct local searches, to get travel directions to a location or between two locations, or to otherwise retrieve map data for a selected region. The user can virtually fly from space (e.g., some vantage point above the Earth) to and around an entered target address or location, such as a neighborhood or other area of interest. Results can be displayed in a two-dimensional or three-dimensional representation of the area of interest. In some the user can pan, tilt, and rotate the view to see three-dimensional terrain and buildings.

The GIS 140 can further allow a user to annotate maps, and/or enable data layers to show, for example, parks, schools, hospitals, airports, shopping, and other points of interest or locales. The GIS 140 can further allow the user to layer multiple searches, save results to folders, and share search results and maps with others.

A user computing device 102 can include a digital mapping application 120 such as a geospatial browser or other suitable viewer that provides an interface between the user computing device 102 and the GIS 140. For instance, the digital mapping application can be configured to display digital map data within a map viewport 124 of a graphical user interface 122. A user of the user computing device 106 can interact with the digital mapping application 120 using graphical user interface 122 to facilitate interactions between the user computing device 102 and the GIS 140. The digital mapping application can provide a user interface for viewing geographic data (e.g. digital map data). The graphical user interface can include a plurality of user interface elements with which the user can interact to facilitate communications between the user computing device 102 and the GIS 140.

According to example aspects of the present disclosure, the digital mapping application 120 can be configured to display a map view of a geographic area including a selected region of a mapped region. As indicated, such map view can facilitate a more intuitive user experience for a user viewing the digital mapping application 120. In this manner, the user computing device 102 can communicate with the GIS 140 to facilitate a provision of the map view to the user.

The geographic information system 140 can include a map manager 142, including map element manager 144. The map element manager 144 can be configured to determine map element data to display with a map associated with a geographic area such as a user selected region. For instance, the geographic area can be a geographic area to be displayed within a viewport of the digital mapping application 120 on the user computing device 102. In some implementations, the user can select the geographic area through an interaction with the digital mapping application 120.

The map element manager 144 can generate or otherwise determine data for map element records 152, such as data describing the location and physical attributes of map elements such as buildings, roads, geographic features, bodies of water, etc. Such map elements may generally be referred to as structures to indicate any type of physical entity present in the real-world. The map element records 152 may include data indicative of feature locations related to the map elements. For example, a map element record 152 for a building may include feature location data 154 that describes the location of entrances, hallways, windows, etc. In some examples, map element records 152 may include polygonal data 156 that describes the outer dimensions of a building or other structure. Polygonal data may include a set of earth-centered, earth-fixed coordinates that define the structure as a bounding box in a geographic area associated with a map. The bounding box may be representative of the perimeter of a building for example. The polygonal data may be generated using various techniques and data sources, such as through an analysis of aerial imagery, satellite imagery, street-level imagery, etc. The analysis may be manual or computer-implemented. In some examples, one or more machine-learned models can be used to automatically generate geographic data associated with a structure based on such imagery, etc. Alternatively or additionally, the polygonal data can be manually added (e.g., through interaction with the geographic information service by an operator of the service or an owner of the building).

Map element manager 144 can generate feature location data 154 for a map element record 152 using motion data 148 and surfel data 150. By way of example, map element manager 144 can access surfel data that describes one or more surface elements of a map element, such as the outer surface of a wall of a building or other structure. Map element manager 144 can access motion data that describes the movement of one or more objects in a geographic area that includes the map element. The motion data can be analyzed relative to the surfel data to identify a feature of the structure. For example, the intersection of one or more traces from the motion data and a wall as identified from the surfel data can be used to determine a geographic location of a feature of the structure, such as an entrance of a building. After determining such a geographic location, the map element manager 144 can store feature location data 154 indicative of the geographic location of the map element feature. Feature location data 154 may include various information. For example, feature location data 154 may include a set of coordinates or other geographic data describing the location of a map element feature in the real-world. Additionally and/or alternatively, the feature location data may describe physical attributes of the map element feature, such as the dimensions of a door or other entrance.

In accordance with example embodiments, LIDAR data and/or other image data can be associated with location information in order to localize the surfel data so that a comparison with motion data can be made. Location information corresponding to a position of one or more sensors can be obtained with the surfel data so that a precise location of the surfels describing a map element can be derived. In some examples, surfel data that is aligned with location information can be obtained by traversing one or more travelways while collecting LIDAR data and GPS or other location information identifying a location of the LIDAR sensor(s) when the LIDAR data is obtained. Visual imagery and/or other data may be obtained while the LIDAR data and location data is obtained. The visual imagery and LIDAR data can be closely aligned based on location identifying information associated with each.

In some embodiments, map element manager 144 may use additional data such as existing map data 146, feature location data 154, and/or polygonal data 156 to generate feature location data 154 for a map element feature. For example, polygonal data 156 may be obtained that describes at least a portion of an outer dimension of a building or other structure represented by a map element. The motion data and polygonal data associated with the map element can be analyzed to determine a candidate location of a feature of the map element. For example, the intersection of the polygonal data representing a building wall and a motion data trace indicating user movement through the location of the wall may be identified as a candidate location of a building entrance. The candidate location of a feature of a map element can be refined based at least in part on surfel data associated with the map element. Surfel data can be obtained that is indicative of surface elements associated with a structure, such as a wall of a building, for example. The candidate location of the entrance defined by polygonal data can be projected onto the wall as derived from the surfel data. After projecting the candidate location to a projected location based on the surfel data, a final geographic location of the building entrance can be determined. The final geographic location can be the projected geographic location or can be determined by combining the candidate location and projected location. For example, an updated alignment can be determined by decreasing the cumulative distance between a first set of points from the candidate location and a second set of points from the projected location.

Map element manager 144 can additionally and/or alternatively update geographic data including polygonal data 156 for a structure based on surfel data associated with at least one external wall of the structure. For instance, a misalignment or disparity between the polygonal data representing a wall location and the surfel data representing the wall location can be determined. The misalignment can be determined based on a difference between the candidate location and the projected location of the entrance in some examples. The misalignment between the polygonal representation and the surfel data representing the wall can be used to modify the original polygonal data of the structure in the geographic data.

Map element manager 144 can additionally and/or alternatively perform a validation of the final geographic location of a structural feature determined from the surfel data and motion data. In some examples, a human operator may indicate on a visual image of the structure (e.g., a wall of the structure) a location of a feature such as an entrance to a building. The visual image may be tightly correlated with the surfel data. A comparison of the entrance location identified by the human operator can be compared with the determined final geographic location. In other examples, a machine-learned model may be trained to identify the location of a structure entrance based on imagery of the structure. The location determined by the machine-learned model can be compared with the final geographic location to validate the determination.

Figure 2:
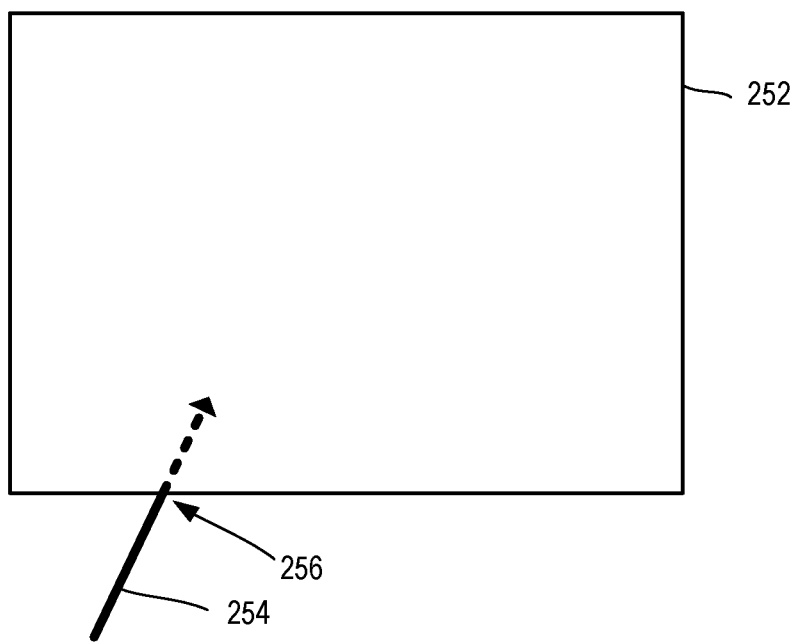
FIG. 2 depicts a block diagram that graphically illustrates determining location data for a feature of a map element based on surfel data and motion data associated with the map element in accordance with example embodiments.

FIG. 2 depicts a block diagram that graphically illustrates determining location data for a feature of a map element based on surfel data and motion data in accordance with example embodiments. A location 252 of a surface of a map element defined by surfel data is depicted, along with a representation of a motion data trace 254 that intersects the surface of the map element. The surfel data represents one or more surface elements of the map element, such as the outer surface of a wall of a building or other structure. The surfel data can be generated using one or more sensors that are capable of capturing an environment of a geographical region as a dense set of points. A surfel may define a dense set of points that form a disc. A surfel can include additional information that defines properties of the disc, such as the flatness and/or normal of the disc. A surfel can be described in terms of a point and an associated normal vector. Surfel data can be generated for a map element using one or more LIDAR sensors, image sensors (e.g., an RGB camera), or any other sensing device capable of generating high-definition data to describe the environment including a structure corresponding to a map element.

Motion data trace 254 is indicative of movement of one or more objects in the geographic area including the location 253 of the map element surface. Motion data may be generated based on sensor data that indicates the location and/or movement of a user computing device or other communication device. For example, computing devices 102, 104, 106 may provide location data to geographic information system 140 at one or more intervals. The motion data may be indicative of a motion path of the least one object. The motion data may also include movement data indicative of velocity, acceleration, or other information relating to movement of the client device. The motion data can be aggregated over time to identify movement of a plurality of client devices, and consequently users, in a geographic area. In example embodiments, the motion data may include one or more motion data traces that are indicative of movement of a plurality of client devices over time. A motion data trace can describe the movement of client devices as a set of location coordinates in some examples. The locations can be defined using global and/or local coordinates. Motion data may be used to build a motion map indicating building layouts, pedestrian passages, trails, etc. Motion data may be additionally and/or alternatively be generated from sensor data indicating where client devices enter or exit a building, such as by detecting a decrease in a Wi-Fi signal and an increase in a GPS signal as indicative of a device leaving the building.

A location 256 of a feature of the map element can be determined based on a correlation of the motion data trace 254 and the location 252 of the map element surface as defined by the surfel data. For example, an intersection of the motion data trace 254 and the location 252 of the surface of the map element can be identified as the geographic location of a feature of the map element. For instance, the location where the motion data indicates pedestrian movement through the wall as defined by the surfel data can be identified as an entrance of a building.

In FIG. 2, map element manager 144 can identify a location 256 where the motion data trace 254 and the location 252 of the map element surface as defined by the surfel data intersect. By way of example, map element manager 144 can determine whether the surfel data defining the wall and the motion data defining the motion data trace have one or more common location coordinates. If so, map element manager 144 can identify the common location coordinate(s) as an intersection of the surfel data for the wall surface and the motion data trace. The map element manager 144 can identify the intersection of the surfel data and the motion data trace as an entrance of a building or other structure, for example.

Figure 3:
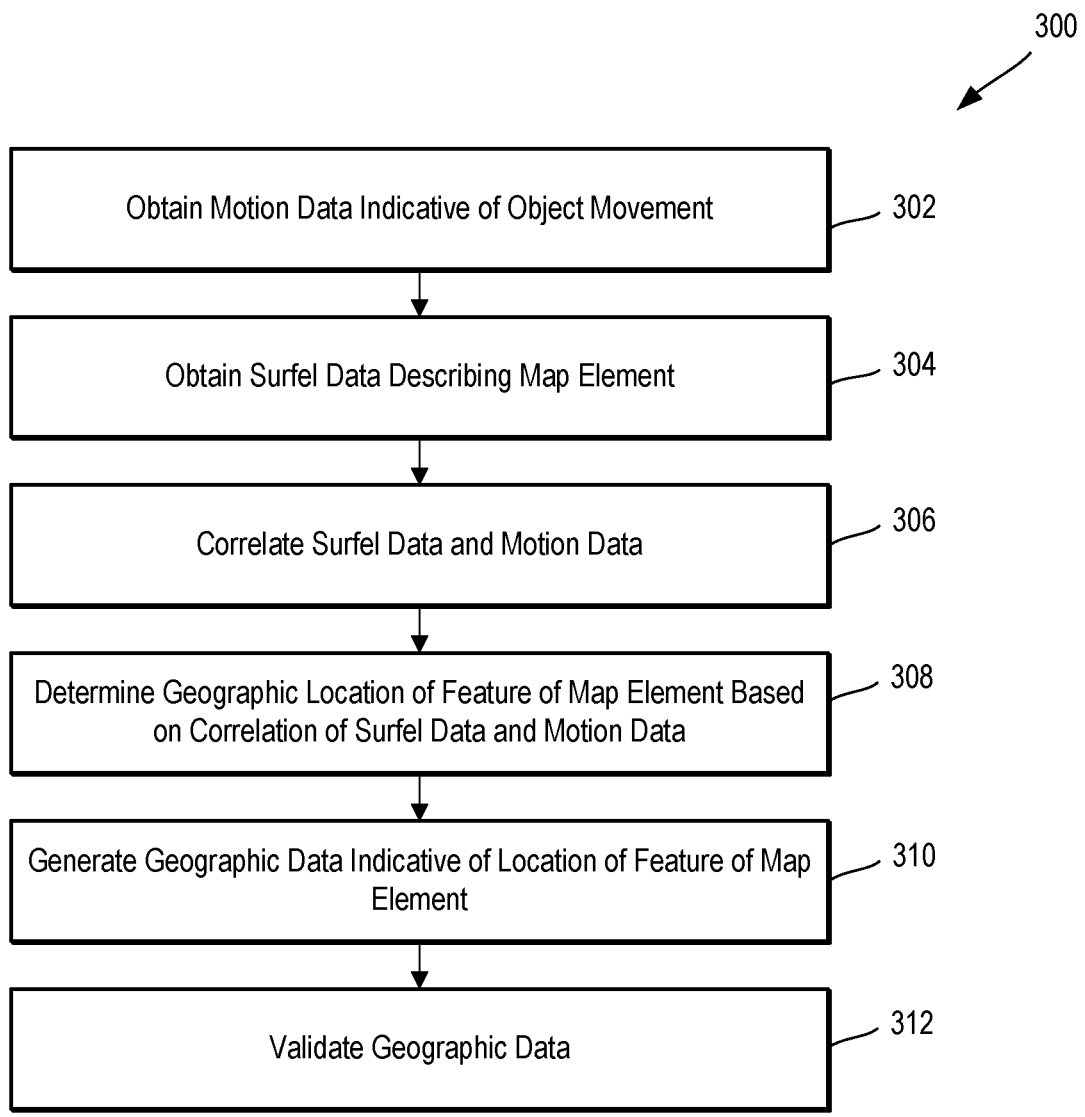
FIG. 3 is a flowchart depicting an example method of generating map data for a feature of a map element based on surfel data and motion data associated with the map element in accordance with example embodiments.

FIG. 3 is a flowchart depicting an example method 300 of generating map data for a feature of a map element based on surfel data and motion data associated with the map element in accordance with example embodiments. One or more portions of method 300 can be implemented by one or more computing devices such as, for example, server computing system 130 or a user computing device 102, 104, 106, as depicted in FIG. 1. One or more portions of the method 300 described herein can be implemented as an algorithm on the hardware components of the devices described herein (e.g., as in FIG. 1) to, for example, generate geographic data that describes the location of a feature of a map element. In example embodiments, method 300 may be performed by a map element manager 144 of server computing system 130. Although FIG. 3 depicts steps performed in a particular order for purposes of illustration and discussion, method 300 of FIG. 3 and methods 400, 500, and 700 described hereinafter are not limited to the particularly illustrated order or arrangement. The various steps of methods 300, 400, 500, and 700 can be omitted, rearranged, combined, and/or adapted in various ways without deviating from the scope of the present disclosure.

At (302), motion data indicative of object movement in a geographic area can be obtained. The motion data can describe movement of one or more objects in a geographic area including one or more map elements, such as a building or other structure. A motion data trace, for example, can represent the movement of objects in the geographic area in which a building or other structure is located. For example, the aggregated movements of pedestrians, as captured by one or more client devices, may indicate movement passages, movement routes, trails, sidewalks, etc. For instance, the movement of pedestrians, parallel to a street-facing wall of a building as may occur by traversing down the sidewalk can be identified. Such a motion data trace may be indicative of the presence of a movement route of pedestrians (e.g., along a sidewalk). Similarly, the movement of pedestrians perpendicular to a street-facing wall of a building, as may occur by traversing from outside to inside or from inside to outside of the building, can be identified. In some specific examples, the intersection of these two motion data patterns may be identified. As another example, a motion pattern associated with pedestrians moving from parallel to perpendicular to a structure may be used as a signal of an entrance to the structure.

At (304), surfel data describing a surface of one or more map elements in the geographic region can be obtained. The surfel data can represent one or more surface elements of a map element, such as the outer surface of a wall of a building or other structure. The surfel data can represent the building wall as a set of points, also referred to as a surfel. The surfel data can include a precise position of the surfels, using a real-world coordinate system or a local coordinate system.

At (306), the surfel data and the motion data are correlated. The intersection of one or more traces derived from the motion data and the wall as derived from the surfel data, can be identified. For example, one or more common coordinates in the surfel data and the motion data can be identified as an intersection of the two data sets.

At (308), a geographic location of a feature of the map element is identified based on the correlation of the surfel data and the motion data. One or more intersections of the surfel data and the motion data can be identified. For example, the location at which pedestrian movement passes through a wall of a building or other structure can be identified based on the intersection of the surfel data and the motion data. An intersection of the surfel data and the motion data can be indicative of a map element feature. For example, the location identified by a common coordinate in both the surfel data and the motion data can be indicative of an entrance of a building or other structure.

At (310), geographic data indicative of the location of the feature of the map element is generated based on the correlation of the surfel data and the motion data. The geographic data may identify the location of the feature of the map element, such as by using one or more real-world or relative coordinates. Additionally, the geographic data may also include data indicative of one or more physical attributes of the feature. For instance, the geographic data for a building entrance may indicate the dimensions of the entrance, such as by including as part of the geographic data additional data indicative of a height and/or width of the entrance.

At (312), the geographic data for the map element is validated. In some examples, a human operator may indicate on a visual image of a structure a location of a feature of the structure, such as the location of a building entrance. The human operator may additionally indicate the dimension of the feature, such as by outlining the feature in the visual image. The visual image may be tightly correlated with the surfel data, using location data associated with acquisition of the image data and/or surfel data for example. A comparison of the building entrance location identified by the human operator can be compared with the geographic location of a building feature as determined by map element manager 144. Validation may be performed using automated computing techniques in other examples. For instance, a machine-learned model may be trained to identify the location of a building door based on imagery or other sensor data describing the building. The location determined by the machine-learned model can be compared with the candidate geographic location to validate geographic data generated by map element manager 144.

Figure 4:
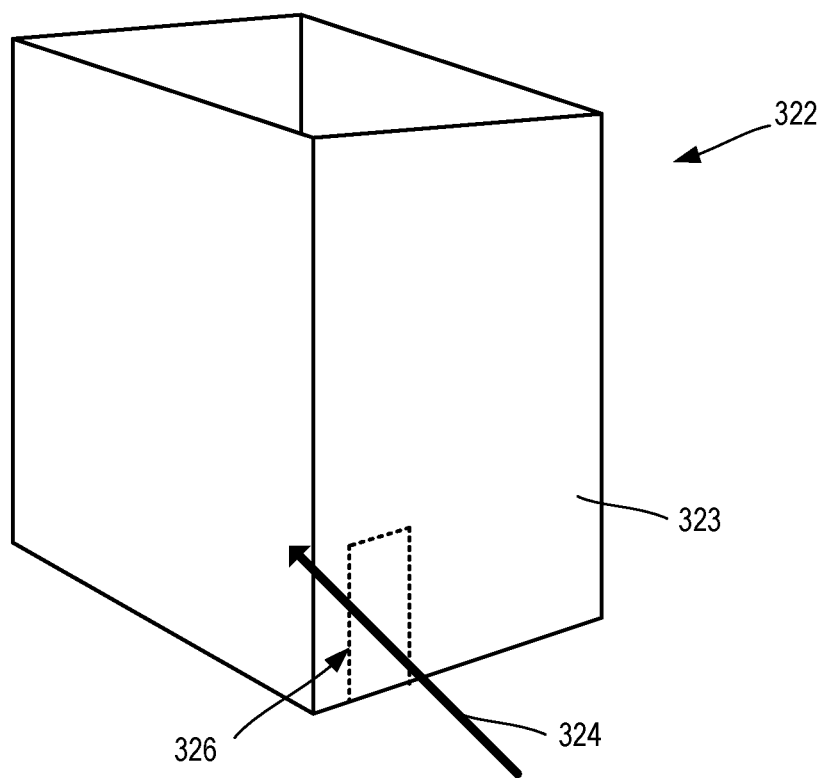
FIG. 4 depicts a block diagram that graphically illustrates determining a candidate location for a feature based on polygonal data and motion data in accordance with example embodiments.

FIG. 4 depicts a block diagram that graphically illustrates determining a candidate feature location for a feature of a map element based on polygon data and motion data in accordance with example embodiments. A bounding box 322 of a structure (e.g., building) as defined by or otherwise derived from polygonal data is depicted. Additionally, a motion data trace 254 is depicted that intersects a location 323 of a surface (e.g., outer surface of a wall of a building) of the structure. The polygonal data defines at least a portion of an outer dimension (e.g., a perimeter) of a map element, which in this example includes a structure having a surface at location 323. The polygonal data may include latitude/longitude coordinates, earth-centered earth-fixed coordinates, World Geodetic System coordinates, or other suitable coordinates that describe the perimeter or outer dimension of the structure.

Motion data trace 324 is indicative of movement of one or more objects in the geographic area including the surface location 323 of the structure as derived from the polygonal data. The motion data and polygonal data associated with the structure can be analyzed to determine a candidate location of a feature of the map element. Map element manager 144 can determine a geographic location for a feature of the surface based on an intersection of the polygonal data describing the building and motion data describing the object movement through the location 323 of the building surface as motion data trace 324. A candidate location 326 of a map feature is identified based on an intersection of the motion data trace 324 and the polygonal data defining the surface location 323. One or more common coordinates shared by the motion data defining motion data trace 324 and polygonal data defining surface location 323 can be identified. The common coordinate(s) can be identified as one or more candidate locations of a map element feature. For example, map element manager 144 can identify the intersection of the polygonal data and the motion data trace as a candidate location of an entrance of a building. The candidate location of the entrance can further define physical attributes of the map element feature, such as the dimension of a building entrance, for example. Optionally, data indicative of a candidate location may further identify an importance, confidence, and/or direction associated with the candidate location.

Figure 5:
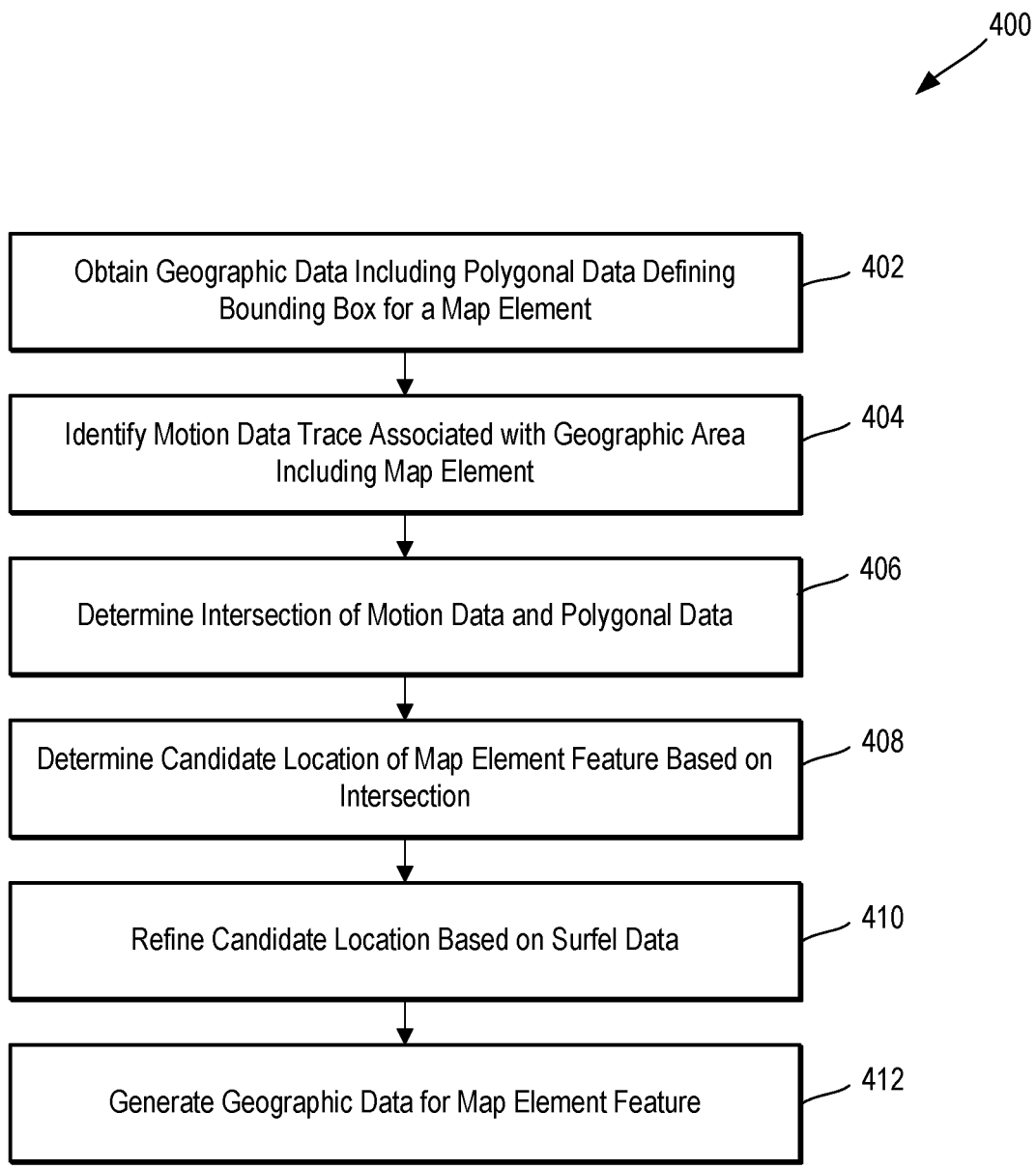
FIG. 5 is a flowchart depicting an example method for generating data indicative of a candidate location of a feature based on polygonal data and motion data in accordance with example embodiments.

FIG. 5 is a flowchart depicting an example method 400 of generating map data for a map element feature based on refining a candidate location of the map element feature. The candidate location can be refined based at least in part on surfel data describing the map element in accordance with example embodiments. One or more portions of method 400 can be implemented by one or more computing devices such as, for example, server computing system 130 or a user computing device 102, 104, 106, as depicted in FIG. 1. One or more portions of the method 400 described herein can be implemented as an algorithm on the hardware components of the devices described herein (e.g., as in FIG. 1) to, for example, generate geographic data that describes the location of a feature of a map element. In example embodiments, method 400 may be performed by a map element manager 144 of server computing system 130.

At (402), geographic data including polygonal data defining at least a portion of a bounding box for a map element is obtained. The polygonal data may define at least a portion of the perimeter or outer dimension of a building or other structure, for example. In some examples, the polygonal data defines less than all of the outer dimensions of the structure.

At (404), one or more motion data traces (or other motion data) associated with a geographic region including the map element are identified. A motion data trace can indicate movement of one or more objects. In some examples, a motion data trace can be identified using GPS or other coordinates.

At (406), one or more intersections of the motion data trace and the bounding box are determined based on a comparison of the motion data and polygonal data. The intersection of one or more traces derived from the motion data and the wall as derived from the polygonal data can be determined. For example, one or more common coordinates in the polygonal data and the motion data can be identified as an intersection of the two data sets.

At (408), a candidate location of the map element feature is determined based on one more intersections of the motion data and the polygonal data. The location at which object movement passes through a wall of the building can be identified based on the intersection (or other overlap) between the polygonal data and the motion data. A location identified by a common coordinate in both the polygonal data and the motion data can be indicative of an entrance of a building or other structure.

At (410), the candidate location of the map element feature is refined based at least in part on surfel data. For example, the candidate location can be modified based at least in part on the surfel data. Various techniques may be used for modifying the candidate location based on surfel data. For instance, the candidate location of an entrance associated with a wall of building can be projected to a location of the wall as defined or otherwise derived from surfel data for the building. A final geographic location of the entrance or other map element feature can be determined based on the projected location. In some examples the final geographic location directly corresponds to the projected location. In other examples, the final geographic location can be determined based on techniques that reduce a distance between points of the candidate location and projected location.

At (412), geographic data for the map element feature is generated based on the refined candidate location. The geographic data may identify the location of the feature of the map element using one or more real-world or relative coordinates. Additionally, the geographic data may also include data indicative of one or more physical attributes of the feature, such as a size of the feature.

Candidate locations of map element features may additionally and/or alternatively be generated at 408 using other techniques. For instance, an entrance detection machine-learned model may be used to remove false positives from candidate locations detected from motion data at 408. Additionally, and/or alternatively, a machine-learned model may be used to initially generate polygonal data including coordinates for an entrance at 408.

Candidate locations of map elements may be refined at 410 using additional and/or alternative techniques. For example, map element manager 144 may identify one or more visual images, such as street-view images that correspond to a candidate location of a map element feature. The one or more visual images can be supplied to a machine-learned model and/or an operator for further analysis based on the candidate location. For example, a machine-learned model may be trained to identify and optionally highlight (e.g., by drawing a line around) an entrance or other map element feature in the one or more images. Alternatively, a human operator may identify and optionally highlight the entrance or other map element feature. A set of earth-centered, earth-fixed (ECEF) or other coordinates for the highlighted map element feature can be generated by map element manager 144. The coordinates can be used to build a polygon in the ECEF space of the map element feature. False positives can be removed if ECEF coordinates are not generated by the map element manager for the candidate location.

Figure 6:
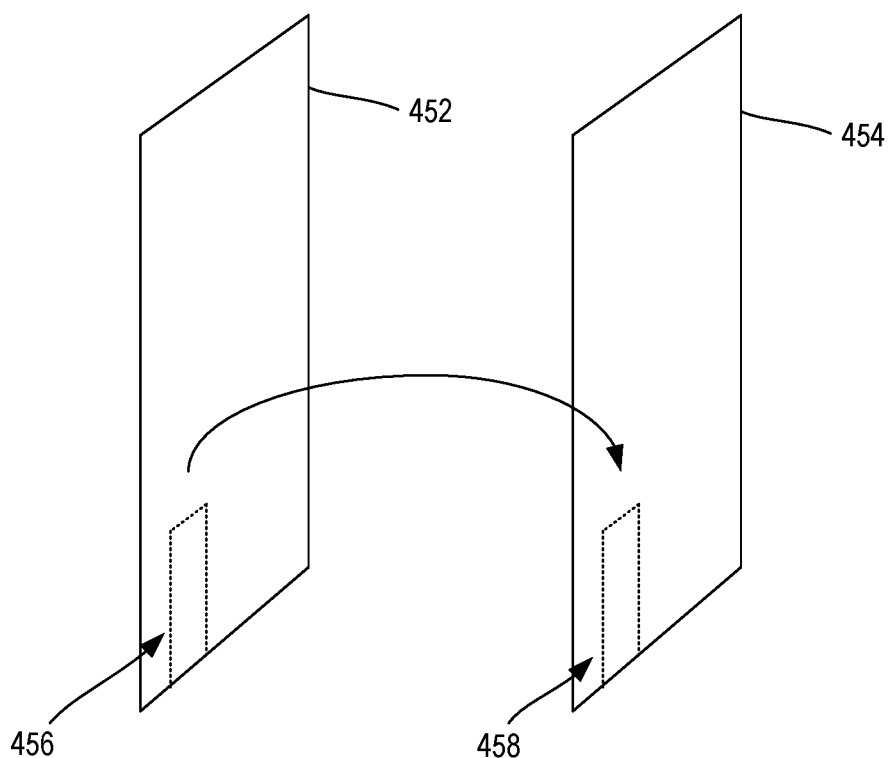
FIG. 6 depicts a block diagram that graphically illustrates a projection of a candidate location of a map feature to a projected location based on surfel data.

FIG. 6 is a block diagram that graphically illustrates a projection of a candidate location of a map feature to a projected location based on surfel data. A first location 452 of a portion of a map element as derived from polygonal data is depicted, alongside a second location 454 of the map element as derived from surfel data. In this particular example, each location 452, 454 depicts the location of a surface of a building wall as derived from the polygonal data and surfel data, respectively. A candidate location 456 of an entrance feature of the building wall is depicted with respect to location 452. The candidate location may be determined based on an intersection of motion data and polygonal data as earlier described.

FIG. 6 depicts a projection of the candidate location 456 onto the wall surface derived from the surfel data of the building. Candidate location 456 is projected onto the surfel data to generate a projected location 458 of the entrance feature. Various techniques may be used to project a candidate location to a projected location. In some examples, a set of coordinates of the surfel data can be identified that correspond to a set of coordinates from the polygonal data that define the candidate location of the map element feature. For instance a set of one or more coordinates from the polygon data may be transposed to one or coordinates in the surfel data.

A final geographic location of a map element feature can be determined based at least in part on a projected location of the map element feature. In some embodiments, the final geographic location is the same as the projected location. In other embodiments, the final geographic location can be determined by combining the candidate location and projected location.

Figure 7:
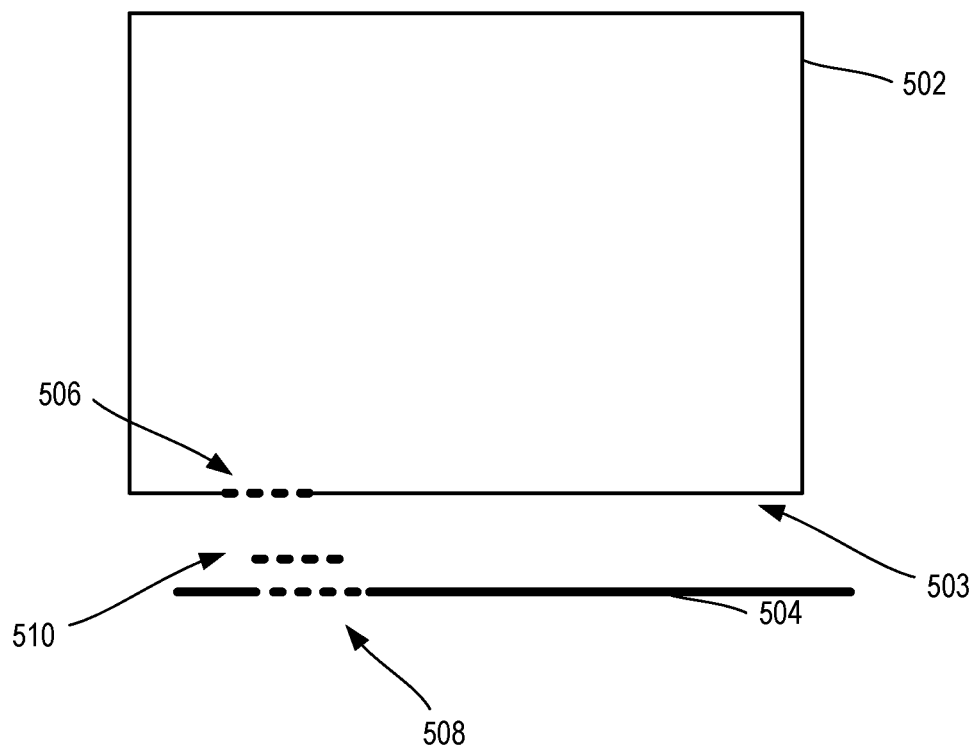
FIG. 7 depicts a block diagram that graphically illustrates determining location data for a map feature based on a combination of a candidate location and a projected location of the map feature.

FIG. 7 depicts a block diagram that graphically illustrates determining a geographic location for a map element feature based on a combination of a candidate location and a projected location. FIG. 7 depicts an overhead view of a bounding box 502 representing the location of a building as defined by polygonal data. A candidate location 506 of a map element feature is depicted on a surface of a wall of the building at a location 503 defined by the polygonal data. A location 504 of the building wall as derived from surfel data is depicted in FIG. 7. A projected location 508 of the candidate location 506 is depicted with respect to the building as derived from the surfel data.

A geographic location 510 of the map element feature is determined based on a combination of the candidate location 506 and the projected location 508. In example embodiments, the candidate location can be modified based on decreasing a distance between a set of points of the candidate location and a set of points of the projected location. An updated alignment can be determined that decreases the cumulative distance between the first set of points and the second set of points. Geographic data indicative of the final geographic location can be generated.

Figure 8:
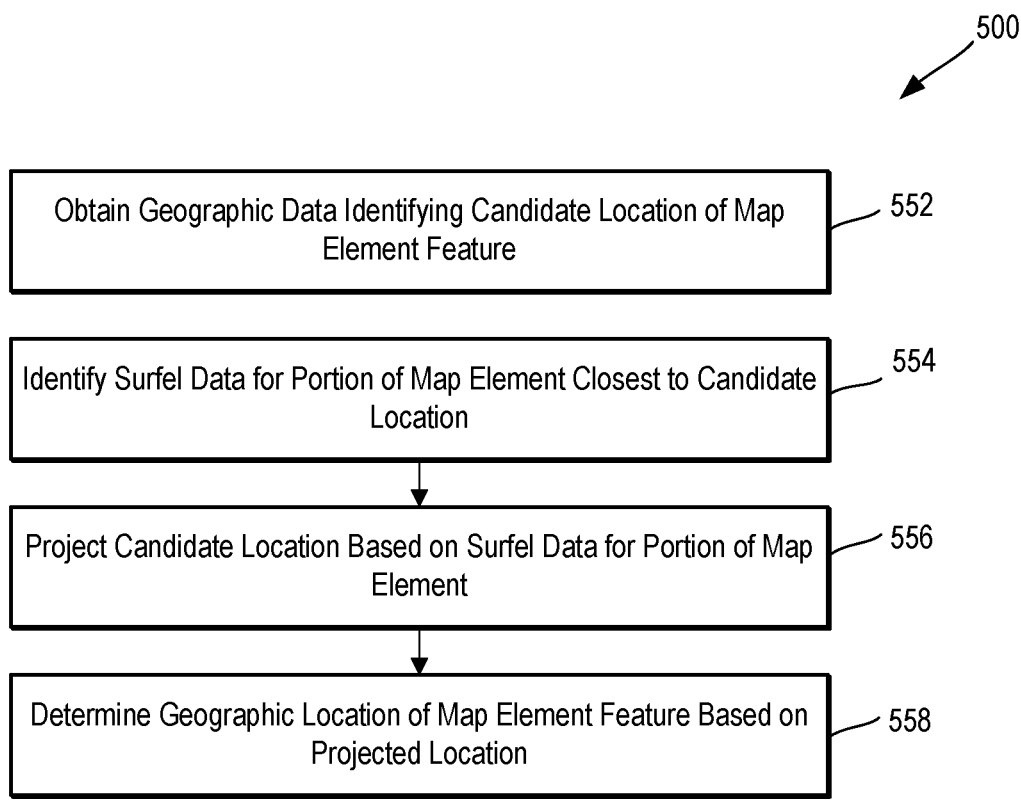
FIG. 8 is a flowchart depicting an example method for determining a geographic location of a map feature based on a projected location.

FIG. 8 is a flowchart depicting an example method 500 of generating map data for a feature of a map element based on a combination of a candidate location and a projected location of the map element feature. In example embodiments, method 500 may be performed at 410 of FIG. 5 to refine a candidate location of a map element feature based on surfel data describing the map element. One or more portions of method 500 can be implemented by one or more computing devices such as, for example, server computing system 130 or a user computing device 102, 104, 106, as depicted in FIG. 1. One or more portions of the method 500 described herein can be implemented as an algorithm on the hardware components of the devices described herein (e.g., as in FIG. 1) to, for example, determine a geographic location of a map element feature. In example embodiments, method 500 may be performed by a map element manager 144 of server computing system 130.

At (552), geographic data is obtained that identifies a candidate location of a map element feature such as a building entrance. The geographic data may define the candidate location based on polygonal data associated with the map element.

At (554), surfel data is identified for a portion of the map element closest to the candidate location. For example, if a candidate location of a building entrance is defined for a street facing-wall of the building, surfel data for the street-facing wall of the building can be identified.

At (556), the candidate location of the map element feature is projected based on the surfel data for the portion of the map element. For example, one or coordinates in the surfel data corresponding to one or coordinates in the polygonal data for the candidate location can be determined. A projected location of the map element feature can be determined based on the projection of the candidate location.

At (558), a geographic location of the map element feature can be determined based on the projected location. In some examples, the geographic location of the map element feature can be determined as the projected location from 556. In other examples, the geographic location of the map element feature can be determined based on a combination of the projected location and the candidate location.

Figure 9:
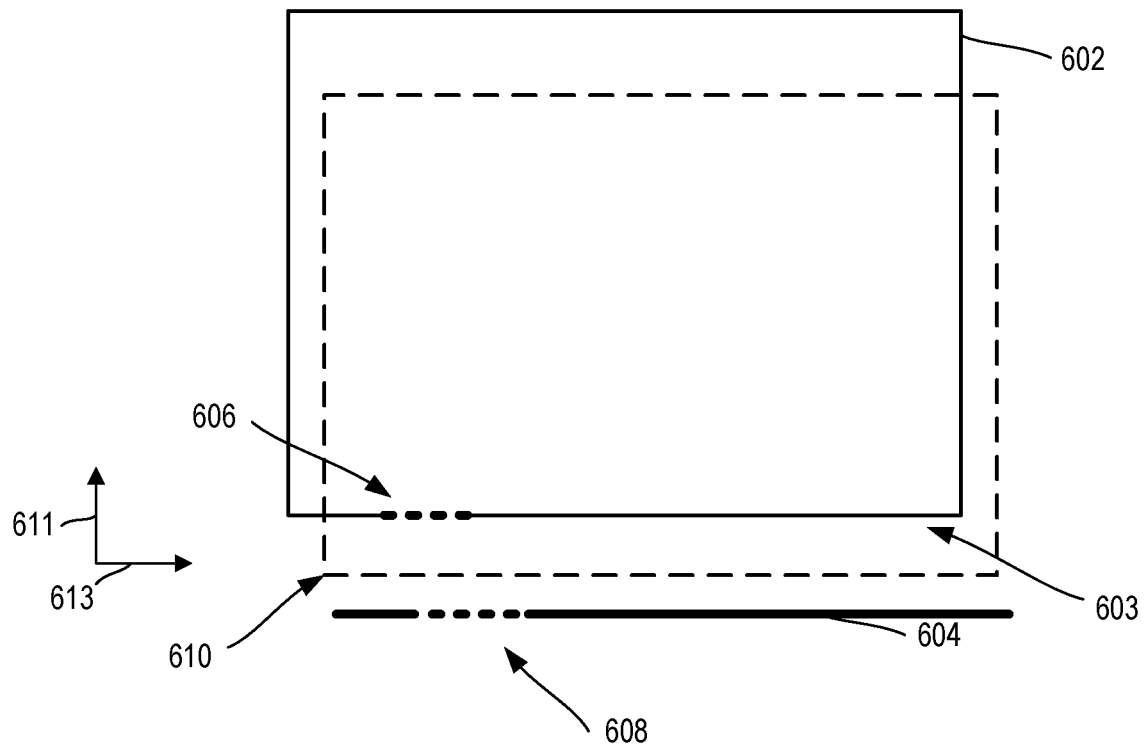
FIG. 9 depicts a block diagram illustrating modified polygonal data based on a projected location of a map feature in accordance with example embodiments.

According to example embodiments, geographic data including polygonal data for a building can be modified based on the original polygonal data of a selected wall of the building and surfel data for the selected wall. FIG. 9 is a block diagram depicting the generation of modified polygonal data based on a projected location of a map feature in accordance with example embodiments. FIG. 9 depicts an overhead view of a bounding box 602 representing the location of a structure as defined by polygonal data. A candidate location 606 of a map element feature is depicted on a surface of a wall of the structure at a location 603 defined by the polygonal data. A location 604 of the wall of the structure as derived from surfel data is also depicted. A projected location 608 of the map element feature is depicted with respect to the wall of the structure as derived from the surfel data.

The polygonal data for the structure can be modified based on a detected misalignment between the candidate location 606 of the map element feature and the projected location 608 of the map element feature. The original polygonal data of the building can be modified by generating new polygonal data that is based on a combination of the original polygonal data and the surfel data as depicted in FIG. 9. FIG. 9 depicts a modified bounding box 610 representing the re-aligned location of the structure as can be determined using surfel data.

A set of vertices or points of the bounding box 602 of the structure wall may be selected and compared with a set of vertices or points of the location 604 of the wall from the surfel data. The vertices or points of the polygonal data can be adjusted to increase an alignment between the polygonal data and surfel data. After aligning polygonal data for the wall based on the surfel data, the remaining portion of the polygonal data can be modified based on the new polygonal data for the shifted wall data.

More particularly, a set of vertices or points of the polygonal data can be compared with a corresponding set of vertices or points of the surfel data. A difference between each point of the polygonal data and a corresponding point of the surfel data can be determined. A new set of points for the polygonal data can be determined based on a minimization of the distance between the points in the original polygonal data and the surfel data. A least squares technique may be applied in example embodiments. An updated alignment can be determined that decreases the cumulative distance between the set of points in the polygonal data and the set of points in the surfel data.

After updating the polygonal data for a map element, the updated polygonal data may be used to generate additional candidate locations of map element features. For example, the motion data can be compared with the updated polygonal data to detect any intersections between the motion data and the updated polygonal data.

In some examples, the surfel data may be used to provide a re-alignment in a first direction such as in an orthogonal direction to the surface of a structure containing a map element feature (e.g., the longitudinal direction 611). For example, surfel data generated by a sensor on-board a vehicle may provide coordinates or location data for a map element relative to the vehicle position. Such a measurement may be used to align the polygonal data in the depth direction based on the surfel data.

According to some embodiments, a re-alignment in a direction orthogonal to the depth direction (e.g., the transverse direction 613) may be provided based on an object detection process. For example, an object detection machine-learned model may be used to align objects in view. For instance, the machine-learned model may be used to align street signs represented by the surfel data with assumed sign locations. Based on the object detection, an alignment between the surfel data and the polygonal data in the transverse direction can be determined. The polygonal data can then be re-aligned based on a detected misalignment of the objects.

Figure 10:
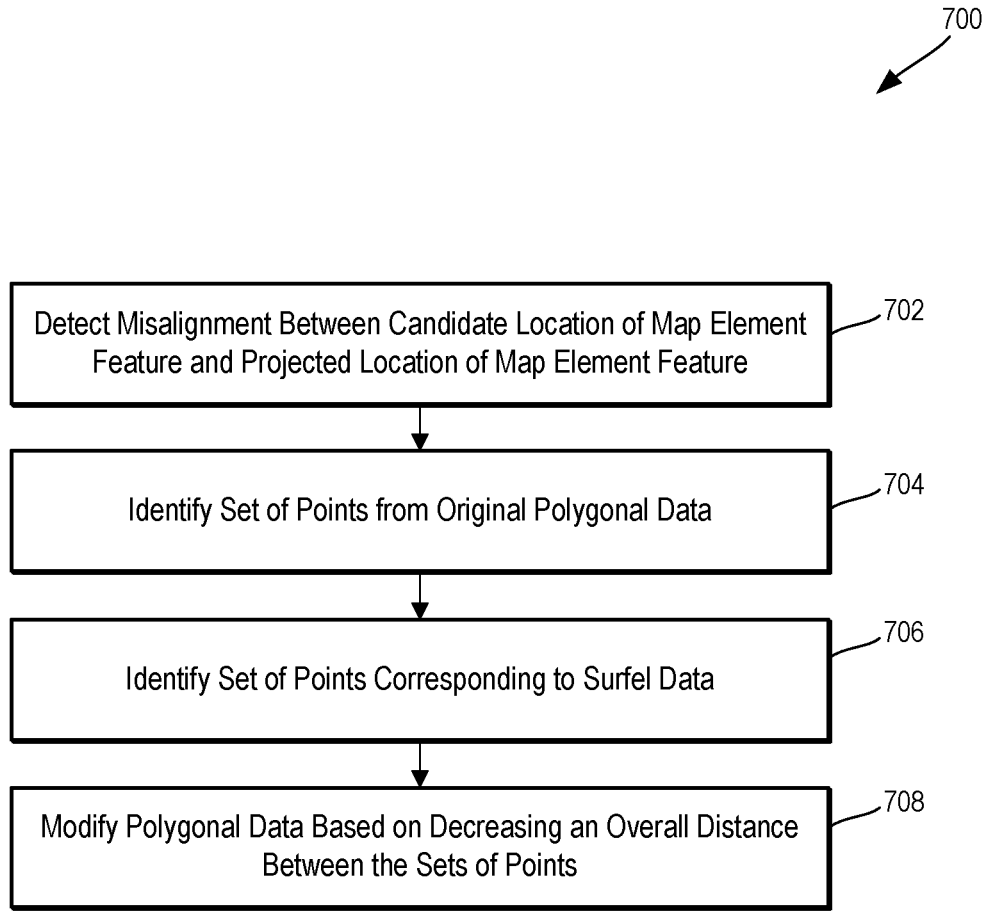
FIG. 10 is a flowchart depicting an example method for modifying polygonal data based on a projected location of a map feature in accordance with example embodiments.

FIG. 10 is a flowchart depicting an example method 700 of generating modified polygonal data for a map element based on a detected misalignment between a candidate location and projected location of a map element feature. One or more portions of method 700 can be implemented by one or more computing devices such as, for example, server computing system 130 or a user computing device 102, 104, 106, as depicted in FIG. 1. One or more portions of the method 700 described herein can be implemented as an algorithm on the hardware components of the devices described herein (e.g., as in FIG. 1) to, for example, generate polygonal data that describes at least a portion of a map element.

At (702), a misalignment between a candidate location of a map element feature and a projected location of the map element feature is detected. Various misalignments may be detected. For example, an offset between one or more coordinates specifying the candidate location and one or more coordinates specifying the projected location can be detected. In some examples, the offset can be in a first direction (e.g., depth direction) such as in an orthogonal direction to a plane defining the surface of the structure wall. The first direction can correspond to a direction between the structure wall and the sensor data that generated surfel data for the wall.

At (704), a set of points or vertices from the original polygonal data corresponding to at least a portion of the map element including the candidate location are identified. In some examples, the set of points or vertices can be from the candidate location of the map element feature. In other examples, the set of points or vertices may include points of vertices outside of the candidate location, such as a set of points corresponding to a structure wall in which the candidate location is located.

At (706), a set of points or vertices from the surfel data corresponding to at least a portion of the map element including the projected location are identified. The set of points or vertices from the surfel data correspond to the set of points or vertices from the polygonal data. In some examples, the set of points or vertices can be from the projected location of the map element feature. In other examples, the set of points or vertices may include points of vertices outside of the projected location, such as a set of points corresponding to a structure wall in which the candidate location is located.

At (708), the original polygonal data for the building is modified based on decreasing an overall distance between the sets of points. An updated alignment can be determined that decreases the cumulative distance between the set of points in the polygonal data and the set of points in the surfel data. The modified polygonal data can reflect the updated alignment for the building.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system for providing map information, comprising:
   one or more processors; and
   one or more non-transitory, computer-readable media that store instructions that when executed by the one or more processors cause the computing system to perform operations, the operations comprising:
      obtaining surfel data representing a surface of a structure;
      obtaining motion trace data indicative of a path of one or more users from an exterior of the structure to an interior of the structure;
      identifying a candidate entrance location of the structure based at least in part on the path of the one or more users from the exterior of the structure to the interior of the structure and a portion of polygonal data defining an outer dimension of the structure;
      estimating an entrance location of the structure based at least in part on a projected location of the candidate entrance location of the structure onto the surface of the structure derived from the surfel data;
      generating geographic data indicative of a geographic location of the entrance location of the structure;
      validating the geographic data using a machine-learned model that takes the geographic data and images of the structure as input;
      updating the existing polygonal data for the structure based on a comparison of the location of the candidate entrance location and the projected location of the candidate entrance location; and
      transmitting the validated geographic data for display in a user interface.

2. The computing system of claim 1 wherein updating the existing polygonal data comprises:
   identifying a first set of one or more points associated with the existing polygonal data;
   identifying a second set of one or more points associated with the surfel data; and
   determining an updated alignment that decreases a cumulative distance between the first set of one or more points and the second set of one or more points.

3. The computing system of claim 2, wherein:
   the first set of one or more points identifies at least one vertex of the structure; and
   the second set of one or more points identifies at least one vertex of a wall.

4. The computing system of claim 1, wherein:
   the motion data is indicative of an outside/inside transition of a respective user in the one or more users; and
   the outside/inside transition is based at least in part on a comparison of a first signal strength associated with a first antenna of a client device and a second signal strength associated with a second antenna of the client device.

5. A computer-implemented method of generating geographic information in association with a geographic information service, the method comprising:
   obtaining, by a computing system with one or more processors, surfel data representing a surface of a structure;
   obtaining, by the computing system, motion trace data indicative of a path of one or more users from an exterior of the structure to an interior of the structure;
   identifying a candidate entrance location of the structure based at least in part on the path of the one or more users from the exterior of the structure to the interior of the structure and a portion of polygonal data defining an outer dimension of the structure;
   estimating an entrance location of the structure based at least in part on a projected location of the candidate entrance location of the structure onto the surface of the structure derived from the surfel data;
   generating, by the computing system, geographic data indicative of a geographic location of the entrance location of the structure;
   validating, by the computing system, the geographic data using a machine-learned model that takes the geographic data and images of the structure as input;
   updating the existing polygonal data for the structure based on a comparison of the location of the candidate entrance location and the projected location of the candidate entrance location; and
   transmitting, by the computing system, the validated geographic data for display in a user interface.

6. One or more non-transitory computer-readable media that store instructions that, when executed by one or more processors, cause the one or more processors to perform operations, the operations comprising:
   obtaining surfel data representing a surface of a structure;
   obtaining motion trace data indicative of a path of one or more users from an exterior of the structure to an interior of the structure;

identifying a candidate entrance location of the structure based at least in part on the path of the one or more users from the exterior of the structure to the interior of the structure and a portion of polygonal data defining an outer dimension of the structure;

estimating an entrance location of the structure based at least in part on a projected location of the candidate entrance location of the structure onto the surface of the structure derived from the surfel data;

generating geographic data indicative of a geographic location of the entrance location of the structure;

validating the geographic data using a machine-learned model that takes the geographic data and images of the structure as input;

updating the existing polygonal data for the structure based on a comparison of the location of the candidate entrance location and the projected location of the candidate entrance location; and transmitting the validated geographic data for display in a user interface.

* * * * *

UNITED STATES PATENT AND TRADEMARK OFFICE
CERTIFICATE OF CORRECTION

| | | |
|---|---|---|
| PATENT NO. | : 12,092,479 B2 | Page 1 of 1 |
| APPLICATION NO. | : 17/945602 | |
| DATED | : September 17, 2024 | |
| INVENTOR(S) | : Michael Sprague, Kevin Oishi and Luigi Bruno | |

It is certified that error appears in the above-identified patent and that said Letters Patent is hereby corrected as shown below:

On the Title Page

Add Item (30) after item (63):
(30) Foreign Application Priority Data
PCT/US2018/050600, filed on September 12, 2018

Signed and Sealed this
Twelfth Day of August, 2025

Coke Morgan Stewart
*Acting Director of the United States Patent and Trademark Office*